United States Patent [19]
Whitener

[11] 3,750,950
[45] Aug. 7, 1973

[54] LIQUID SENSING SWITCH ASSEMBLY

[76] Inventor: Robert V. Whitener, 20 Tall Tree Ct., Huntington, N.Y. 11743

[22] Filed: Aug. 10, 1971

[21] Appl. No.: 170,525

[52] U.S. Cl................ 239/63, 200/61.05, 239/67
[51] Int. Cl............................................ B05b 17/04
[58] Field of Search........................ 239/63, 67, 64; 200/61.04, 61.05

[56] References Cited
UNITED STATES PATENTS

| | | | |
|---|---|---|---|
| 1,262,391 | 4/1918 | Sabol | 200/61.05 X |
| 2,171,329 | 8/1939 | Boone | 200/61.05 |
| 2,946,512 | 7/1960 | Richards | 239/63 |
| 2,969,185 | 1/1961 | Geiger | 239/63 |
| 3,079,089 | 2/1963 | Tomayer | 239/63 |
| 3,118,606 | 1/1964 | Rotunda | 239/63 |
| 3,297,254 | 1/1967 | Coffman | 239/63 |

Primary Examiner—M. Henson Wood, Jr.
Assistant Examiner—Edwin D. Grant
Attorney—Imirie & Smiley

[57] ABSTRACT

A switch assembly activated by conductive liquids, typically water, and based upon use of a longitudinally slit resilient cylinder, carrying one of a pair of spaced, parallel rod-shaped electrodes at each side of the cylinder wall slit. A bolt passed transversely through the cylinder may be adjusted as to constrict or relax the resilient cylinder to thereby vary the spacing of the parallel electrode rods and the sensitivity characteristics of the switch. Moisture, for example, in the form of sprinkler produced water droplets, or the level of surface irrigation water, may bridge the electrode gap by impinging thereon and spreading longitudinally by surface tension effects. The resulting change in current may be utilized to trip a relay in an irrigation system supplying the activating water droplets, or—where the switch is used in a level detector system—to provide a precise indicating signal that the monitored liquid level has become accessible to the electrode gap.

4 Claims, 8 Drawing Figures

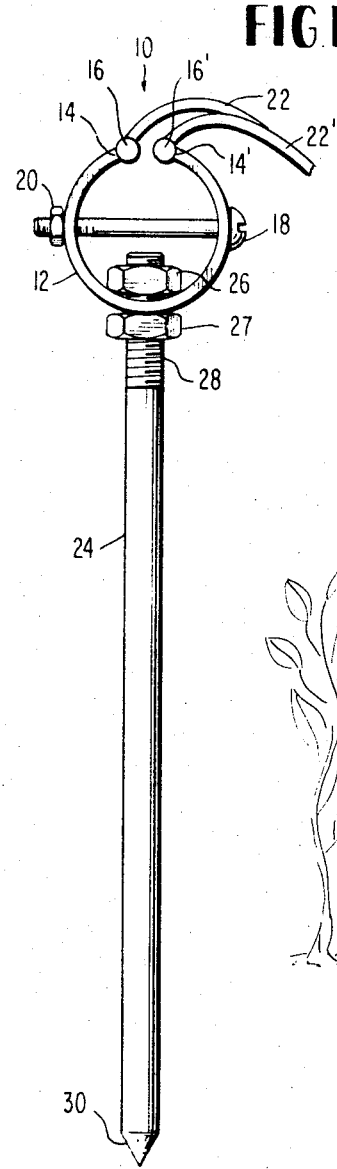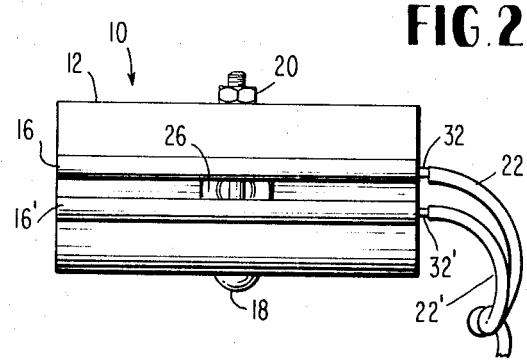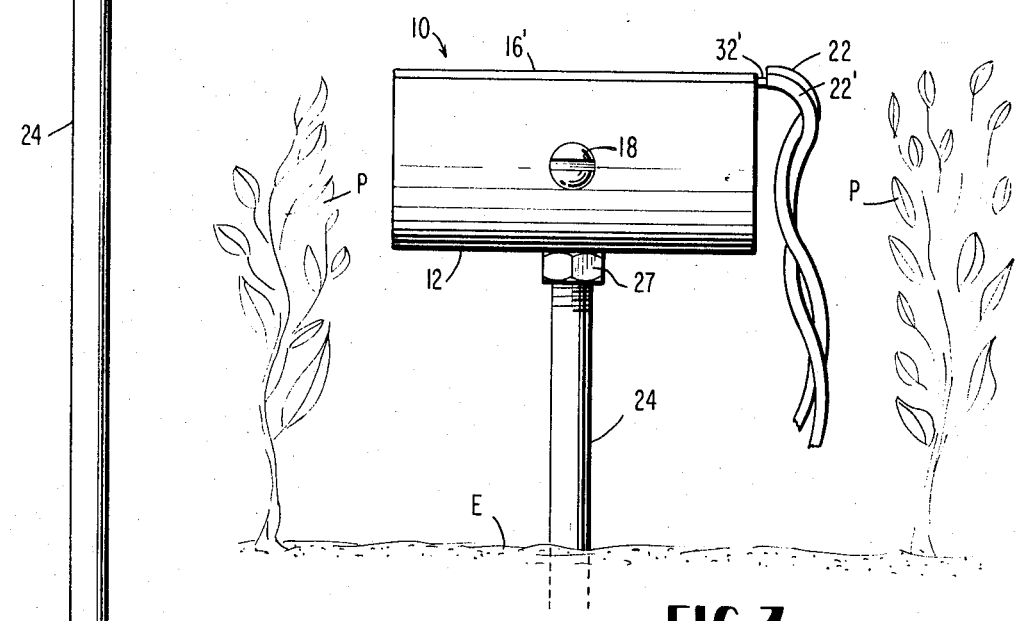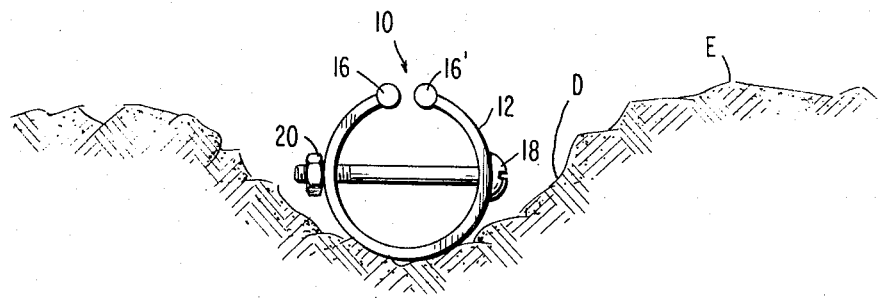

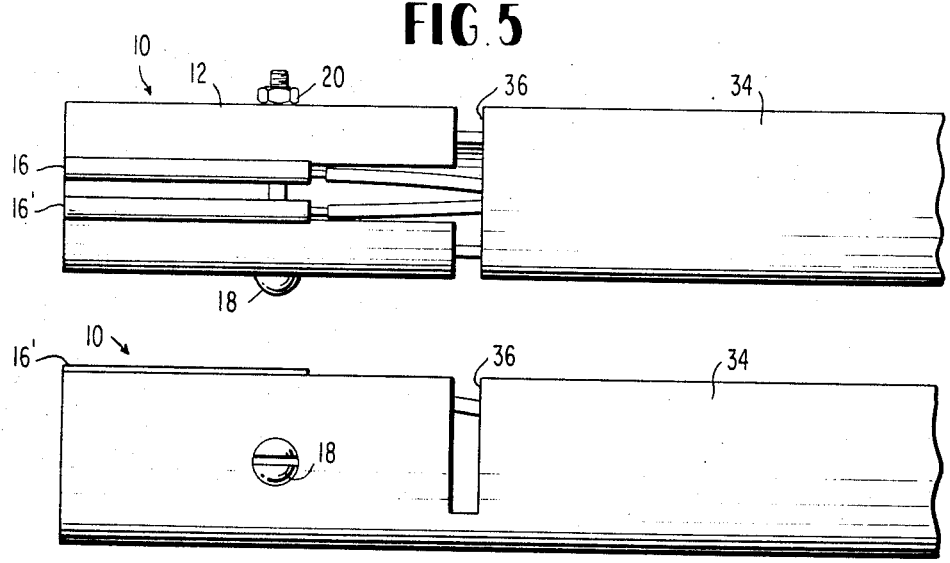
FIG. 5
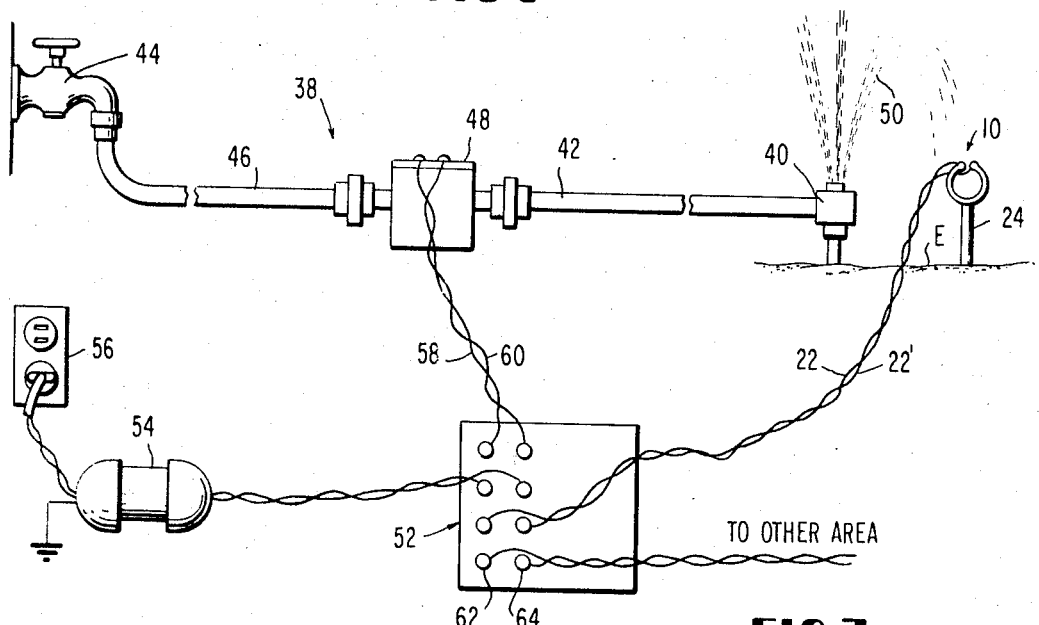
FIG. 6
FIG. 7
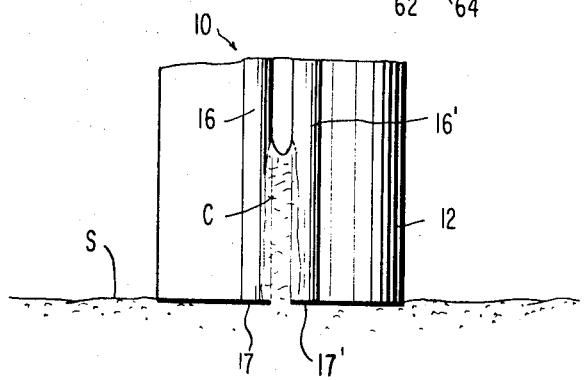
FIG. 8

3,750,950

LIQUID SENSING SWITCH ASSEMBLY

BACKGROUND OF THE INVENTION

This invention relates generally to switches and systems for detecting conductive liquids, and more specifically relates to a moisture-activated switch which may be utilized in irrigation system or as the key element in a liquid level detection system.

It has long been known in the agricultural arts that by utilizing very precise control of available moisture, relatively enormous augmentation can be achieved in the propogation of new plant cuttings and similar plant organisms. In particular, it is well-known that with proper control of applied moisture, full and continuous exposure to sunlight is possible without the wilting and dying of plants that will occur in the absence of such careful control. In the past, however, devices capable of providing the accurate and demanding control required for such applications have not been evident—particularly at a level of cost that would make such devices practical for the large scale applications needed in agricultural installations. Such devices as are known are thus not only complex and frequently demanding of sophisticated peripheral equipment for use therewith, but moreover, are often inflexible in design in the sense that they are not readily adjustable to be responsive to a wide variety of desired moisture conditions.

In this connection, it may be noted that an ideal device for application of moisture to agricultural systems is one which detects and retains portions of moisture incident upon the irrigated plants in a functional manner resembling the plant's own mechanisms. The known prior art devices on the other hand generally thwart such result in that they do not incorporate moisture gathering and retention mechanisms which are sufficiently analogous to the plant functions to call for moisture at depletion levels corresponding to plant need. In one type of widely used device, for example—known as the "electronic leaf"—a pair of conducive black electrode buttons are present on a plastic insulator sheet. Leakage of current during open circuit conditions, however, is so erractic in this type of construction that it is difficult to choose a signal for cut-on or cut-off of externally applied irrigation which is truly indicative of plant requirements.

Moreover, different types of plant life function better with different types of moisture supply, whereas prior art control systems for the most part have depended largely upon means for detecting saturation of ground moisture and this type of control is highly unsatisfactory for some types of plant life. For example, some types of plants absorb moisture primarily through their leaves rather than through their roots. Consequently, if the ground becomes too saturated, the latter type of plant with sprinkler irrigation, receives excessive moisture when control is measured by ground saturation, and this can effect as much damage as proper moisture regulation can promote benefits.

On the other hand, other types of plants are adversely affected by too much leaf wetting and do better with ground supplied moisture only. Thus, one type of plant is best controlled by a switch detector at atmospheric moisture while the other type preferably is irrigated by soil moistening means such as ditches and the like and control best is effected by liquid level detection.

OBJECTS OF THE INVENTION

In accordance with the foregoing, it may be regarded as an object of the present invention, to provide a moisture responsive switch assembly, activateable by the incident water drops of an irrigation system or the like controlled thereby, which is of exceedingly simple, economical and dependable construction.

It is a further object of the invention, to provide a switch assembly for irrigation sprinkling systems or the like, which is activated by impinging atmospheric water, and which without the use of additional electrical processing, provides a high level sustained signal which is directly useable for activation of control relays or so forth.

It is an additional object of the present invention, to provide a simple, dependable switch assembly which in response to impinging irrigation water controls the system issuing such water, which switch is adjustable in a simple expeditious manner to render it responsive to selected moisture conditions.

It is a yet further object of the invention, to provide a switch construction for detecting available moisture and controlling irrigation in response thereto, which gathers and retains such moisture in a manner simulative of corresponding plant function, whereby control of applied moisture is closely correlated with plant need.

It is still an additional object of the present invention, to provide a moisture responsive switch assembly, which may be effectively utilized to provide a sharp, sustained, and high level signal upon moisture reaching the edges of an electrode pair mounted therein, whereby such switch may be utilized as part of a simple but highly effective liquid level detector system.

SUMMARY OF THE INVENTION

According to the present invention, a switch construction based upon use of a longitudinally slit resilient cylinder, each slit abounding wall of the cylinder carrying one of a pair of spaced, parallel, rod-shaped electrodes. A bolt is passed transversely through the cylinder and may be adjusted to constrict or relax the resilient cylinder to vary the spacing of the parallel electrodes and thus the moisture detecting characteristics of the switch. Moisture, in the form for example of water droplets, may bridge the electrode gap by impinging thereon and spreading longitudinally by surface tension effects. The resulting change in current may be utilized to trip a relay in an irrigation system supplying the water droplets. In another environment, the switch may be oriented so that the said rods are vertically disposed above a surface where a liquid level is to be monitored—for example, for leak detection purposes. Upon the liquid on such surface reaching the proximate ends of the electrode pair, the liquid rises therebetween by capillary action to close a circuit connected to an alarm indicator or other signalling device.

BRIEF DESCRIPTION OF THE DRAWINGS

FIG. 1 is an elevational end view of a switch assembly in accordance with the invention; the embodiment illustrated being adapted for control of a spray irrigation system;

FIG. 2 is a plan view of the FIG. 1 device;

FIG. 3 is a side elevational view of the FIG. 1 device;

FIG. 4 is an end elevational view of the device for detecting ground saturation by surface irrigation;

FIG. 5 is a plan view of the FIG. 4 modification;

FIG. 6 is a side elevational view of the FIG. 4 modification;

FIG. 7 is a simplified schematic diagram of an irrigation sprinkler system utilizing the switch assembly of the invention; and FIG. 8 is a fragmentary enlarged elevational view of the device in a liquid level detect environment.

DETAILED DESCRIPTION OF THE INVENTION

Referring now to the drawings, specifically to FIG. 1-3, a switch assembly 10 includes a cylinderical member 12 of electrically non-conducive material and having a longitudinal slit providing a pair of spaced parallel edge portions 14, 14' respectively supporting a pair of rod-shaped electrodes 16, 16', and a cylinder compression means in the form of a threaded bolt 18 passed transversely through member 12 and a complementary nut 20 threaded thereon. A pair of conductors 22, 22' are attached to electrodes 16, 16' at the ends thereof and extend to a circuit in which the said assembly is to be incorporated.

Cylinder member 12 comprises an insulating material and is characterized in possessing a high degree of resiliency, by virtue of which the member 12 may be constricted or relaxed by advancing or retarding the nut 20 relative to the head of bolt 18, drawing electrodes 16, 16' together or permitting greater spacing thereof. Suitable materials for member 12 include PVC plastics, methyl methycrylate formulations, and various other known plastics possessing good insulating properties in addition to the desired spring-like qualities.

As is best seen in FIG. 2, electrodes 16, 16' are a pair of cylindrical rod-shaped members which are secured to the wall edges 14, 14' by any convenient means including cementing or mechanical fastening; the electrodes extending the entire axial length of cylindrical member 12. By virtue of such contruction electrodes 16, 16' are parallel, and spaced from one another by a gap which selectively is variable in accordance with the adjustment of the nut 20 on the bolt 18.

Electrodes 16, 16' preferably comprise at their external surface a black coloration, as such surface characteristic serves the dual function of (A) maintaining high surface solar heating at the electrodes whereby to accurately simulate temperatures of the vegetation in the area and (B) the black coloration is found to be relatively non-attractive to insects—the latter often serving as an undesired source of fouling contamination of brighter, metallic colored electrodes. Such electrodes may for such purposes suitably comprise carbon or graphite rods. Platinized mickel, black nickel plate brass or other known black conductive materials. The exposed connections 32, 32' between the conductors 22, 22' and electrodes 16, 16' may comprise any convenient means including soldering or the like.

As a moisture detecting switch for use in irrigation projects, the switch 10 functions most efficiently when it is disposed in an area and at a level corresponding to the moisture received by the plants. Thus, plants that are leaf responsive to atmospheric borne moisture are best irrigated by spray or sprinkler systems so that the switch preferably is located above ground and approximately at the level of the plant leaves so that it will be subject to exactly the same moisture conditions as the plant leaves. Alternatively for the plants that are best irrigated for root absorption of moisture, the switch preferably is disposed within or below the level of the ground surface in an irrigation ditch, for example, so that it will be actuated when the level of irrigation water in the ditch reaches the level of the electrodes, it having previously been determined that at what level the water supplies sufficient moisture to saturate the ground.

For purposes of measuring and detecting atmospheric borne moisture, as with a sprinkler system, the switch assembly 10 best is supported above ground level and approximately at the level of the leaves of the plants P being sprinkled, as shown in FIG. 3. For this purpose, as best shown in FIG. 1, the switch assembly may be mounted on a rod-like support 24 the upper end 28 of which passes transversely through the lower wall of cylinder member 12 and is secured thereto by a nut 26 threaded upon the upper end 28 of the support to clamp the cylinder wall against a stop 27 that may be a nut. The lower end 30 of the support 24 preferably is pointed and formed as a spike for ready insertion into the earth E, FIG. 3, at the geographical area at which the assembly 10 is to be utilized. The switch assembly is disposed in a level position to avoid draining of drops collected on the electrodes 16, 16' so that the drops can build up to bridge the gap between the electrodes.

FIGS. 4–6 show the switch assembly 10 with a modified support arrangement more particularly adapted for determining liquid level at the ground surface for controlling surface irrigation. For this purpose the assembly 10 is disposed horizontally within an irrigation ditch D within the earth E. In this arrangement, irrigation liquid is supplied to the ditch D in the usual manner and when the liquid level within the ditch reaches a point that it bridges the electrodes 16, 16', the switch deactivates the liquid supplying pump. In this form the cylindrical member 12 preferably constitutes the terminal portion of a conduit 34 which is separated from the cylindrical member 12 by a recess 36 that extends transversely of the conduit 34 substantially to the bottom wall portion so as to avoid affecting the flexability of the opposite side portions of the cylindrical member 12. The conduit 34 encloses the wires 22, 22' to protect them against abrasion with the soil or wear and tear by engagement by operators or tools in attending the plants P.

The function of the switch assembly 10 and its organizational association with the control system of an irrigation system, is substantially identical regardless of the type of irrigation. In other words, the switch assembly as specifically illustrated in FIGS. 1–3 is more particularly adapted for use in sprinkler type irrigation systems whereas the switch assembly 10 shown in FIGS. 4–6 is more specifically adapted for use with surface type irrigation systems. However, the controls for these systems may by substantially identical and the organization of the switch assembly 10 with such systems is identical. Therefore, for the purpose of illustration of a complete assembly, FIG. 7 shows such an organization associated with a sprinkler system.

The system 38 shown in FIG. 7 includes the switch assembly 10 shown in FIGS. 1–3 and which controls the issuing of water by a spray or sprinkler nozzle 40. The latter is connected to a water line 42 fed from a water source 44 through a hose 46 and solonoid valve 48. Normally, the valve 48 is open so that spray 50 issues from nozzle 40 until such time as water droplets impinging upon the electrodes 16, 16' of the switch assembly effect closing of the valve 48. This is effected whenever bridging of the gap between the electrodes builds up to a sufficient extent to cause tripping of a relay 52 to which conductors 22, 22' are connected, power for such relay being provided via a stepdown transfer 54 connected to conventional 115 V.AC line power source 56. Upon such event occuring, an input is provided to solonoid valve 48 via lines 58, 60 from relay 52, to close valve 48 and terminate further sprinkling. A pair of terminals 62, 64 of relay 52 may be utilized to shunt power from relay 52 to further relays in other areas under sprinkler control. Circuitry details of relay 52 and the associated tripping circuit are not shown because such circuitry is well-known in the electrical arts, and does not per se comprise part of the present invention.

By virtue of the fact that the gap between the electrodes 16, 16' in assembly 10 is adjustable, the spacing of the electrodes readily may be adjusted from a few thousandths of an inch up. Water droplets impinging upon the electrodes will tend to adhere to both adjacent electrode surfaces to bridge the gap and will in fact spread by surface tension effects to the maximum lengthwise direction of such gap (that is parallel to the electrodes) which is consistent with the total volume of such drops. The important net result of such phenomenon is very rapidly to provide an extended conducting path between electrodes, even by relatively small volumes of water captured therebetween, and in consequence a rapidly built-up and high level electrical signal is attainable. Obviously, the effects of a given volume of water in providing a conducting path between electrodes will be a function of the electrode spacing; accordingly, it will be clear that the sensitity of assembly 10 readily may be adjusted by varying the electrode spacing through adjustment of the bolt 18 and nut 20. In this same connection, it also will be observed that capture and retention of impinging water droplets is effected by the angle of incline of support 24 with respect to earth $E$. Thus, the sensitivity of assembly 10 may also be varied by varying the insertion angle of support 24 in the ground.

Once an extended column of liquid is present in the gap between the electrodes due to capiliary action an electric current is established to actuate the solenoid valve 48 to cut-off the water supply so that further sprinkling ceases until such time as the captured column of liquid evaporates or runs off. In this connection it will be appreciated that the column of extended liquid between electrodes 16, 16' is, in the process of evaporations and run-off, subjected to atmospheric conditions, i.e., of humidity, wind, etc., which are substantially identical to the conditions to which the vegetation itself is exposed. Furthermore, the very extended and thinly spread condition of such liquid column is itself highly simulative of the status of the water within the plant interstices. In consequence of these conditions, the issuance of spray 50 may by means of the present invention be very highly correlated with actual plant requirements.

The present invention, while particularly suitable for use in the agricultural environments previously set forth, also lends itself very effectively to other environments. A modification of the switch assembly appearing in FIGS. 1 and 4 is thus particularly useful in a level detecting system, as shown in FIG. 8. For this purpose, the assembly 10 is not intended for use with the electrodes oriented in essentially horizontal fashion; rather it is intended that the electrodes be vertically oriented whereby the terminal ends 17, 17' of the electrodes 16, 16' and more importantly the gap therebetween, may be positioned on or above a surface $S$, normally horizontal, to be monitored. In view of such purpose, no means for horizontal support are porvided and instead the cylinder member 12 may be secured to the surface or a support extending vertically therefrom.

In a typical application the ends 17, 17' may be spaced a short distance above (or be in virtual contact with) a floor or similar surface, or a maximum liquid level within a tank, the object of such arrangement being to immediately detect the presence of a liquid surface such as might occur through bursting of pipes adjacent such floor, or through spillage, seepage or so forth, or attainment of the desired maximum liquid content within a storage receptacle. FIG. 8 illustrates on a somewhat enlarged scale, and in diagrammatic fashion how the present arrangement enables rapid and positive detection of such a liquid surface. In particular, it is seen that upon the surface of such liquid rising to a point where contact with the electrodes can occur, the liquid rapidly rises by capillary action to form an extended vertical column $C$ between electrodes. In consequence of such action, a circuit which the pair of electrodes is disposed is closed.

The closed circuit, in analogy to the showing of FIG. 7 may be to one side of a relay, the other side of such relay typically being connected to an alarm or other indicator advising an attandant that the liquid level beneath assembly 10 has risen to the bottom end thereof. It will, of course, be evident that liquid surface can be the upper boundary of a very thin liquid film, as for example where assembly 10 is functioning as a leak detector or so forth; or the liquid surface can be the upper edge of a mass of contained liquid in a tank,—in which case the assembly 10 is commonly functioning as a simple level detector.

While the present invention has been particularly set forth in terms of specific embodiments thereof, it will be understood in view of the instant disclosure, that numerous variations upon the invention are now enabled to those skilled in the art, which variations, in propriety, yet reside within the scope of the instant teaching. Accordingly, the present invention is to be broadly construed and limited only by the scope and spirit of the claims now appended hereto.

The embodiments of the invention in which an exclusive property privilege is claimed are defined as follows:

1. An irrigation system comprising in combination:
   a. means for supplying water to an area to be irrigated;
   b. a water source and supply conduit connected to said means;
   c. normally open solenoid valve means in said supply conduit;
   d. relay means for activating said solenoid valve;
   e. power supply means for said solenoid valve and relay; and
   f. a nomrally open liquid activated switch assembly positioned in said irrigated area to receive incident water, said switch assembly being adapted to activate said relay upon closing by incident water, whereby to discontinue said supply of water, said switch assembly comprising:

1 a resilient insulating cylinder having a longitudinal slit extending the length thereof; (2) a pair of conductive rod-shaped electrodes secured to the cylinder edges bounding said slit to define a pair of parallel spaced electrodes; and (3) conductor means connected to said electrode pair and disposing said switch in circuit with said relay, whereby water impinging upon said electrodes and bridging the gap and spreading therebetween by surface tension effects, provides a conductive path to close said switch.

2. Apparatus in accordance with claim 1, further including means to adjustably constrict the said cylinder, whereby to vary the spacing between said electrodes and the resultant sensitivity of said switch assembly to incident liquid.

3. Apparatus in accordance with claim 2, wherein said electrodes are black surfaced.

4. Apparatus in accordance with claim 1 wherein said water supply means comprises a spray nozzle.

* * * * *